United States Patent [19]

Marans et al.

[11] 3,926,755
[45] Dec. 16, 1975

[54] RADIATION POLYMERIZABLE POLYESTER COMPOSITION

[75] Inventors: Nelson S. Marans; Alfred Gluecksman, both of Silver Spring, Md.

[73] Assignee: W. R. Grace & Co., New York, N.Y.

[22] Filed: June 21, 1974

[21] Appl. No.: 481,732

Related U.S. Application Data

[62] Division of Ser. No. 398,317, Aug. 17, 1973, abandoned.

[52] U.S. Cl. ...... 204/159.15; 204/159.18; 260/861; 260/864; 260/865; 427/44; 427/54
[51] Int. Cl.² .................. C08F 2/48; C08L 67/06; C08L 67/00
[58] Field of Search ............... 204/159.15; 260/861

[56] References Cited
UNITED STATES PATENTS

| | | | |
|---|---|---|---|
| 3,455,858 | 7/1969 | Taft | 260/836 |
| 3,754,054 | 8/1973 | Kimura et al. | 204/159.15 |

OTHER PUBLICATIONS

Meincke et al., Chemical Abstracts, Vol. 77 (1972), p. 50, Article No. 49472J.

*Primary Examiner*—Murray Tillman
*Assistant Examiner*—Thurman K. Page
*Attorney, Agent, or Firm*—Elton Fisher

[57] ABSTRACT

A radiation curable polyester composition prepared by admixing; (a) a polyester of an ethylenically unsaturated polycarboxylic acid and a polyhydric alcohol; and (b) a compound having the formula

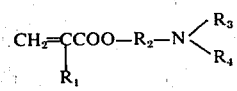

in which $R_1$ is hydrogen or a lower alkyl group, $R_2$ is an alkylene group having 2-8 carbon atoms and $R_3$ and $R_4$ are lower alkyl groups. Styrene or diallyl phthalate can also be a component of the radiation curable polyester composition.

14 Claims, No Drawings

RADIATION POLYMERIZABLE POLYESTER COMPOSITION

This is a division of application Ser. No. 398,317 filed Aug. 17, 1973.

BACKGROUND OF THE INVENTION

This invention is in the field of radiation induced polymerization. More particularly, this invention is directed to a polyester composition which can be polymerized (cured) by radiation. Such composition can be prepared by intimately mixing; (a) 35–85 parts of a polyester of an ethylenically unsaturated polycarboxylic acid and a polyhydric alcohol; and (b) 15–65 parts of an amino compound having the formula

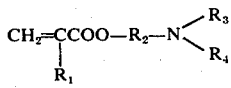

in which $R_1$ is hydrogen or a lower alkyl group $R_2$ is an alkylene group having 2–8 carbon atoms, and $R_3$ and $R_4$ are lower alkyl groups, the polyester plus the amino compound totaling 100 parts. $R_1$ can be the same as or different from $R_3$ and/or $R_4$.

Ethylenically unsaturated polyesters of the type recited above are well known to those skilled in the art and are described in U.S. Pat. No. 3,594,439 (Baker, 260/863). Said Patent is incorporated herein by reference.

An alternative radiation curable composition can be prepared by admixing; (a) 35–85 parts of a polyester of an ethylenically unsaturated polycarboxylic acid and a polyhydric alcohol; (b) 5–50 parts of the above-described amino compound; and (c) 5–45 parts of styrene or diallyl phthalate, the polyester, plus the amino compound, plus the styrene or diallyl phthalate totaling 100 parts.

SUMMARY OF THE INVENTION

A composition consisting essentially of an intimate mixture of; (a) 35–85 parts of polyester of an ethylenically unsaturated polycarboxylic acid and a polyhydric alcohol; and (b) 15–65 parts of an amino compound having the formula

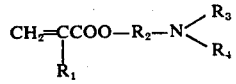

in which $R_1$ is hydrogen or a lower alkyl group, $R_2$ is alkylene group having 2–8 carbon atoms, and $R_3$ and $R_4$ are lower alkyl groups, the polyester plus the amino compound totaling 100 parts.

DESCRIPTION OF PREFERRED EMBODIMENTS

In preferred embodiments of the invention recited in the above summary:

1. The ethylenically unsaturated polycarboxylic acid has 4–8 carbon atoms.
2. The polyhydric alcohol has 2–12 carbon atoms.
3. Said composition is cured (polymerized) by irradiation with 0.01–10. Mrads (more preferably 0.1–2.5 Mrads) of high energy ionizing radiation.
4. Said composition consists essentially of 40–80 parts of said polyester and 20–60 parts of said amino compound.
5. There is present 0.01–5 parts (more preferably 0.1–2 parts) of a photocuring rate accelerator per 100 parts of the composition of the Summary
6. Preferred photocuring rate accelerator include benzophenone, dibenzosuberone, and acetophenone.
7. Where a photocuring rate accelerator is present in said composition the composition can be cured by a process comprising irradiating a film (or coating) of the composition with actinic light (actinic radiation) preferably having a wave length of 2000–4000A at a rate to provide about 0.0001–20 watts per square centimeter of film surface for a period of about .001–120 minutes (preferably 0.01–60 minutes).
8. Where a photocuring rate accelerator is present it is also preferred that the ethylenically unsaturated polycarboxylic acid has 4–8 carbon atoms and that the polyhydric alcohol has 2–12 carbon atoms.

In another preferred embodiment ("Embodiment A") this invention is directed to a radiation curable composition consisting essentially of an intimate mixture of; (a) 5–85 parts of a polyester of an ethylenically unsaturated polycarboxylic acid and a polyhydric alcohol; (b) 5–50 parts of the above-described amino compound; and (c) 5–45 parts of styrene or diallyl phthalate, the polyester, plus the amino compound, plus the styrene or diallyl phthalate totalling 100 parts.

In preferred embodiments of the invention recited in Embodiment A, supra:

1. The ethylenically unsaturated polycarboxylic acid has 4–8 carbon atoms.
2. The polyhydric alcohol has 2–12 carbon atoms.
3. Said composition is cured (polymerized) by irradiation with 0.01–10 Mrads (more preferably 0.1–2.5 Mrads) of high energy ionizing radiation.
4. Said composition consists essentially of 50–90 parts of said polyester and 10–50 parts of styrene or diallyl phthalate.
5. There is present 0.001–5 parts (more preferably 0.1–1.2 parts) of a photocuring rate accelerator per 100 parts of said composition (the composition of Embodiment A).
6. Preferred photocuring rate accelerator include benzophenone, dibenzosuberone, and acetophenone.
7. Where a photocuring rate accelerator is present in said composition the composition can be cured by a process comprising irradiating a film (or coating) of the composition with actinic light (actinic radiation) preferably having a wave length of 2000–4000A at a rate to provide about 0.0001–20 watts per square centimeter of film surface for a period of about .001–120 minutes (preferably 0.01–60 minutes).
8. Where a photocuring rate accelerator is present it is also preferred that the ethylenically unsaturated polycarboxylic acid has 4–8 carbon atoms and that the polyhydric alcohol has 2–12 carbon atoms.

DETAILED DESCRIPTION OF THE INVENTION

We have made the surprising discovery that; (1) compositions consisting essentially of an intimate mixture of; (a) a polyester of the type recited in the above Summary; and (b) an amino compound of the type recited in the above Summary; and (1) compositions consisting essentially of; (a) said polyester; (b) said amino compound; and (c) styrene or diallyl phthalate (as recited in Embodiment A and the embodiments thereunder) are cured (polymerized) where subjected to a small dosage of high energy ionizing radiation; such radiation includes X-rays, gamma rays, an electron beam, a neutron beam, or a proton beam. The radiation dosage required to produce a good cure is about 0.05–2 (preferably about 0.1–0.5) Mrads.

This result (the curing of our compositions with a low dosage of radiation) is surprising because such low dosage of radiation will not cure the polyester component of our composition in the absence of the amino component, and such a low dosage of radiation will not cure the amino component in the absence of the polyester component. Neither will such low dosage of radiation cure styrene nor diallyl phthalate.

Our composition is stable and does not polymerize where stored for several weeks in the absence of significant amounts of radiation.

We have also found that, where a photocuring rate accelerator (or mixture of such accelerators) is present in our compositions (an intimate mixture of the polyester and the amino compound as described in the above Summary or an intimate mixture of the polyester, the amino compound, and styrene or diallyl phthalate as described in Embodiment A, supra) said compositions are readily cured by irradiation with actinic light including ultraviolet light having a wave length of about 2000–4000A.

Preferred photocuring rate accelerators include but are not limited to benzophenone, acetophenone, acenaphthenequinone, o-methoxybenzophenone, thioxanthen-9-one, xanthen-9-one, 7H-benz[de]anthracen-7-one, dibenzosuberone, 1-naphthaldehyde, 4,4'-bis(-dimethylamino) benzophenone, fluoren-9-one, 1-indanone, 2-tert-butylanthraquinone, valerophenone, hexanophenone, 8-phenylbutyrophenone, p-morpholinopropiophenone, 4-morpholinobenzophenone, 4'-morpholinodeoxybenzoin, p-diacetylbenzene, 4-aminobenzophenone, 4'-methoxyacetophenone, benzaldehyde, α-tetralone, 9-acetylphenanthrene, 2-acetylphenanthrene, 10-thioxanthenone, 3-acetylphenanthrene, 3-acetylindole, 1,3,5-triacetylbenzene, and the like including mixtures thereof.

Surprising, mixtures of 95–99.5 parts of our above described polyester and 0.5–5 parts of photocuring rate accelerator was not cured where exposed to radiation by actinic light under conditions which cured our above described compositions (the compositions of this invention). Neither was the above-described amino compound (the amino compound described in the above Summary) cured where admixed with the photocuring rate accelerator (95–99.5 parts of the amino compound and 0.5–5 parts of the photocuring rate accelerator) and irradiated with actinic light under conditions which cured our above-mentioned compositions.

Samples of our composition containing 0.1–5 parts of the above-named photocuring rate accelerators were stable and did not polymerize where stored for several weeks in the absence of significant amounts of radiation including the absence of actinic light. (the compositions of our invention). Neither were styrene nor diallyl phthalate cured where admixed with a photocuring rate accelerator (95–99.5 parts of styrene or diallyl phthalate and 0.5–5 parts of the photocuring rate accelerator and irradiated with actinic light under conditions which cured our above-described compositions (the compositions of the instant invention).

Amino compounds having the formula

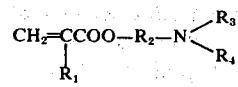

wherein $R_1$, $R_2$, $R_3$, and $R_4$ are as defined in the above Summary which were found to be especially useful in the composition and process of our invention include but not limited to; dimethylaminoethyl methacrylate; diethylaminoethyl methacrylate; dimethylaminopropyl methacrylate; dimethylaminobutyl methacrylate; dimethylaminoethyl acrylate; diethylaminoethyl acrylate; dimethylaminopropyl acrylate; dimethylaminobutyl acrylate; those compounds having said formula in which; $R_1$ is $C_2H_5$; $R_2$ is $CH_2CH_2$; and (I) $R_3$ and $R_4$ are both; (a) $CH_3$ (b) $C_2H_5$; (c) $CH_2CH_2CH_3$; (d) $CH_2CH_2CH_2CH_3$; and (e) $CH_2CH(CH_3)2$; those compounds having said formula in which; $R_1$ is $CH_3$; $R_2$ is $CH_2CH_2$; $R_3$ is $CH_3$; and (II) $R_4$ is (a) $C_2H_5$; (b) $CH_2CH_2CH_3$; (c) $CH_2CH_2CH_2CH_3$; and (d) $CH_2CH(CH_3)_2$; those compounds having said formula in which $R_1$ is $CH_2CH_2CH_2CH_3$; $R_2$ is $CH_2CH_2CH_2CH_2CH_2$; and (III) $R_3$ and $R_4$ are both (a) $CH_3$, $C_2H_5$; (b) $CH_2CH_2CH_3$; (c) $CH_2CH_2CH_2Ch_3$; (d) $CH_2CH_2CH(CH_3)_2$ and (e) $CH_2CH_2CH_2CH_2CH_3$; and those compounds having said formula in which $R_1$ is any lower alkyl group; $R_2$ is any alkylene group having 2–8 carbon atoms; $R_3$ is any lower alkyl group; and $R_4$ is any lower alkyl group.

As taught by the above-mentioned U.S. Pat. No. 3,594,439, polyesters prepared from ethylenically unsaturated polycarboxylic acids frequently contain saturated acid moieties (e.g., saturated dicarboxylic acid moieties or other saturated polycarboxylic acid moieties). The presence of such moieties in a polyester prepared from an ethylenically unsaturated polycarboxylic acid and a polyhydric alcohol does not interfere with the use of such polyesters in preparing the composition of our invention.

As taught by said patent, polyesters prepared from ethylenically unsaturated polycarboxylic acids and polyhydric alcohols frequently contain inhibitors such as amine hydrochlorides, quaternary ammonium salts, and the like. The presence of such inhibitors in polyesters made from ethylenically unsaturated polycarboxylic acids and polyhydric alcohols does not interfere with the use of such polyesters in our composition.

Also, as taught by said patent, polyesters prepared from ethylenically unsaturated polycarboxylic acids and polyhydric alcohols frequently contain accelerators such as cobalt acetate, cobalt napthenate, barium octoate, and the like. The presence of such accelerators does not interfere with the use of polyesters prepared from ethylenically unsaturated polycarboxylic acids and from polyhydric alcohols in the composition of our invention.

It is also known polyesters prepared from ethylenically unsaturated polycarboxylic acids and polyhydric alcohols are frequently admixed with styrene or diallyl phthalate (DAP), e.g., 5–30% or more of styrene or DAP. The presence of such amounts of styrene (or DAP) in a polyester of an ethylenically unsaturated polycarboxylic acid and a polyhydric alcohol does not interfere with the use of such polyester in the composition of our invention.

It is also well known that polyester resins can contain appreciable amounts (1–5% or more) of fillers such as fiber glass, talc, mica, clay, and the like. The presence of such fillers in a polyester of an ethylenically unsaturated polycarboxylic acid and a polyhydric alcohol do not interfere with the use of such polyesters in the composition of our invention.

The instant invention will be better understood by referring to the following specific but nonlimiting examples. It is understood that said invention is not limited by said examples which are offered merely as illustrations; it is also understood that modifications can be made without departing from the spirit and scope of the invention.

EXAMPLE 1

The polyester used in this example was a commercially available polyester of an ethylenically unsaturated polycarboxylic acid, a saturated polycarboxylic acid, and a polyhydric alcohol. The polyester was prepared by the reaction of phthalic anhydride and maleic anhydride with ethylene glycol. As purchased the polyester was a mixture of the afore-mentioned polyester and styrene. The proportions of polyester to styrene were about 70 parts of polyester and 30 parts of styrene.

95 parts of said polyester-styrene mixture (PSM) were admixed with 5 parts of a dimethylaminoethyl methacrylate (DMAEMA) to form a mixture which was designated "Composition 1".

A portion of Composition 1 was applied to a glass plate and irradiated with a high energy electron beam generated by a Van de Graaff generator. The radiation dosage was 0.25 Mrad. The composition cured to produce a hard film of cured polymer bonded to the glass plate.

EXAMPLE 2

The general procedure of Example 1 was repeated; however, in this instance 90 parts of the PSM described in Example 1 was admixed with 10 parts of DMAEMA to yield a composition which was designated "Composition 2".

A coating of composition 2, was applied to a glass plate and irradiated with an electron beam, the dose being less than 0.25 Mrad. The irradiated composition formed a hard coating of cured polymer which firmly adhered to the glass plate.

EXAMPLE 3

The general procedure of Example 1 was repeated. However, in this instance 75 parts of the PSM described in Example 1 was admixed with 25 parts of DMAEMA to form a mixture which was designated "Composition 3".

A thin coating of Composition 3 was applied to a glass plate and irradiated as in Example 1, but using a lower dosage of radiation. In this instance the dosage was less than 0.25 Mrads. The coating on the glass plate cured to form a hard film which adhered firmly to the glass plate.

EXAMPLE 4

The general procedure of Example 1 was repeated. However, in this instance another polyester (a polyester of an ethylenically unsaturated polycarboxylic acid and a polyhydric alcohol) was used. Said polyester was free of styrene and diallyl phthalate. 70 parts of said polyester and 30 parts of DMAEMA were admixed to form a mixture which was designated "Composition 4".

A film of Composition 4 was applied to a glass plate which was then irradiated as in Example 1 but using a lower dosage. In this instance the dosage was less than 0.25 Mrads. The film cured to form a hard coating firmly adhering to the glass plate.

EXAMPLE 5

A film of the polyester described in Example 4 (without the addition of DMAEMA) was applied to a glass plate and irradiated as in Example 1. The film did not cure at a radiation dose of 0.25 Mrads. Neither did said film cure when the dosage was increased to 1 Mrad. Neither did the film cure when the dosage was increased to 1.50 Mrads. However, curing occured when the dosage was increased to 3 Mrads. Similar results (no curing at radiation dosages below 3 Mrads) were obtained with a film of the PSM described in Example 1 (without the addition of DMAEMA).

EXAMPLE 6

A film of DMAEMA was applied to a glass plate and irradiated as in Example 1. The film did not cure at a radiation dose of 0.25 Mrads. Neither did it cure at a radiation dosage of 1.25 Mrads. Neither did said film cure when the dosage was increased to 8 Mrads.

EXAMPLE 7

A composition designated Composition 7 was prepared by admixing benzophenone and a portion of the above described Composition 1 using 1 percent benzophenone based on the weight of the resulting Composition 7.

EXAMPLE 8

A series of runs was made repeating the general procedure of Example 7. However, in said runs, Composition 1 was replaced with Compositions 2–4 (as indicated in Table 1) and the resulting benzophenone containing compositions, each of which contained one percent benzophenone, were designated as indicated in said Table.

TABLE 1

| Preparation of Benzophenone-Containing Compositions | | |
|---|---|---|
| Run No. | Starting Composition | Designation of Resulting Compositions |
| 1 | Composition 2 | "Composition 8-A" |
| 2 | Composition 3 | "Composition 8-B" |
| 3 | Composition 4 | "Composition 8-C" |

EXAMPLE 9

A film of composition 7 was applied to a glass plate which was then irradiated for 15 minutes with actinic light from a 275 watt Westinghouse Sunlamp positioned to provide a radiation dosage of 4000 microwatts per square centimeter of the film's surface as measured with a short wave length ultra violet meter. The film cured to form a hard smooth coating firmly adhering to the glass plate.

EXAMPLE 10

A series of runs was made using the general procedure of Example 9 but modified by replacing composition 7 of Example 9 with Compositions 8-A, 8-B, and 8-C as shown in Table 2. Irradiation time for each run is also shown in Table 2.

TABLE 2

| Irradiation of Compositions with Actinic Light | | |
|---|---|---|
| Run No | Composition Irradiated | Irradiation Time, Minutes |
| 1 | 8-A | 3 |
| 2 | 8-B | 3 |
| 3 | 8-C | 3 |

In each instance the film of irradiated composition cured to form a hard smooth film firmly adhering to the glass plate.

EXAMPLE 11

A mixture designated Composition 11 was prepared by admixing 99 parts of the polyester used in Example 4 and one part of benzophenone.

A film of Composition 11 was applied to a glass plate and irradiated according to the general procedure of Example 9. Said film was not cured after being irradiated for 6 minutes. Neither was it cured after being irradiated for 1 hour.

EXAMPLE 12

The general procedure of Example 11 was repeated; however, in this instance the polyester was replaced with DMAEMA and the resulting mixture of DMAEMA and benzophenone was designated Composition 12.

A film of Composition 12 on a glass plate did not cure on being irradiated for 6, 10, and 60 minutes according to the general procedure of Example 9.

EXAMPLE 13

The general procedure of Example 11 was repeated. However, in this instance the PSM described in Example 1 (i.e., the polyester-styrene mixture conataining about 30% styrene) was used and the resulting mixture of said PSM and benzophenone was designated Composition 13.

A film of Composition 13 on a glass plate did not cure on being irradiated for 6, 10, and 60 minutes according to the general procedure of Example 9.

Neither were films of mixtures of; (a) styrene, and benzophenone (99% styrene and 1% benzophenone); and (b) DAP and benzophenone (99% DAP and 1% benzophenone) cured where irradiated according to the general procedure of Example 9 for 6, 10, and 60 minutes.

The compositions of this invention are useful for forming hard protective films on surfaces including wooden, metal, and glass surfaces. Such surfaces include the surfaces of furniture, walls, countertops, sinks, floors, roofs, artistic designs, and the like. Other uses of said compositions will, because of our disclosure be readily apparent to those skilled in the art.

Preferred film thicknesses (thickness of cured film) are 0.05–20 (or 0.1–5) mils; however, the film thickness is not critical and excellent results have been obtained with thicker and thinner films. It is well known to those skilled in the art that the presence of fillers which are opaque to actinic light (actinic radiation) can substantially decrease the penetration of actinic light into (or through) a film, coating, or layer of a photocurable composition and hence decrease the thickness of such composition which can be cured where the composition is exposed to a specific or predetermined dosage of actinic radiation. Such fillers are known to those skilled in the art.

It is also known to those skilled in the art that high energy ionizing radiation has certain depths of penetration in, any given system depending on the energy and type of radiation.

As used herein the term "percent (%)" menas parts per hundred, and the term "parts" menas parts by weight.

As used herein the term "lower alkyl group" means an alkyl group having 1 to about 7 carbon atoms.

As used herein the term "Mrad" means megarad.

As used herein the term "DMAEMA" means dimethylamino- means ethyl methacrylate.

As used herein the term "PSM" means polyester-styrene mixture.

As used herein the term "DAP" means diallyl phthalate.

We claim:

1. A process for curing a radiation curable composition consisting essentially of an intimate mixture of;
    a. 35–85 parts of a polyester of an ethylenically unsaturated polycarboxylic acid and a polyhydric alcohol; and
    b. 15–65 parts of an amino compound having the formula

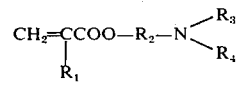

in which $R_1$ is hydrogen or a lower alkyl group, $R_2$ is an alkylene group having 2–8 carbon atoms, and $R_3$ and $R_4$ are lower alkyl groups, the polyester plus the amino compound totaling 100 parts, said process comprising irradiating said composition with 0.05–2 Mrads of high energy ionizing radiation.

2. The process of claim 1 in which the ethylenically unsaturated polycarboxylic acid has 4–8 carbon atoms.

3. The process of claim 1 in which the polyhydric alcohol has 2–12 carbon atoms.

4. A process for curing a radiation curable composition consisting essentially of an intimate mixture of; a. 5–85 parts of a polyester of an ethylenically unsaturated polycarboxylic acid and a polyhydric alcohol; (b) 5–50 parts of an amino compound having the formula

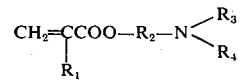

in which $R_1$ is hydrogen or a lower alkyl group, $R_2$ is an alkylene group having 2–8 carbon atoms, and $R_3$ and $R_4$ are lower alkyl groups; and (c) 5–45 parts of styrene or diallyl phthalate, the polyester, plus the amino compound, plus the styrene or the diallyl phthalate totaling 100 parts, said process comprising irradiating said composition with 0.05–2 Mrads of high energy ionizing radiation.

5. The process of claim 4 in which the ethylenically unsaturated polycarboxylic acid has 2–8 carbon atoms.

6. The process of claim 4 in which the polyhydric alcohol has 2–12 carbon atoms.

7. A process for curing a radiation curable composition consisting essentially of an intimate mixture of; (a)

35–85 parts of polyester of an ethylenically unsaturated polycarboxylic acid and a polyhydric alcohol; (b) 15–65 parts of an amino compound having the formula

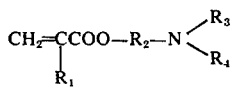

in which $R_1$ is hydrogen or a lower alkyl group, $R_2$ is an alkylene group having 2–8 carbon atoms, and $R_3$ and $R_4$ are lower alkyl groups, the polyester plus the amino compound totaling 100 parts; and (c) 0.1–5 parts of a photocuring rate accelerator per 100 parts of the polyester plus the amino compound, said process comprising irradiating a film of said composition with actinic light for 0.001–60 minutes at a rate to provide about 0.0001–20 watts per square centimeter of film surface.

8. The process of claim 7 in which the ethylenically unsaturated polycarboxylic acid has 4–8 carbon atoms.

9. The process of claim 7 in which the polyhydric alcohol has 2–12 carbon atoms.

10. The process of claim 7 in which the photocuring rate accelerator is benzophenone, dibenzosuberone, or acetophenone.

11. The process of claim 10 in which the ethylenically unsaturated polycarboxylic acid has 4–8 carbon atoms and the polyhydric alcohol has 2–12 carbon atoms.

12. A process for curing a radiation curable composition consisting essentially of an intimate mixture of; (a) 5–85 parts of a polyester of an ethylenically unsaturated polycarboxylic acid and a polyhydric alcohol; (b) 5–50 parts of an amino compound having the formula

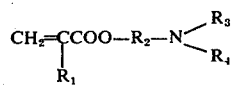

in which $R_1$ is hydrogen or a lower alkyl group, $R_2$ is an alkylene group having 2–8 carbon atoms, and $R_3$ and $R_4$ are lower alkyl groups; and (c) 5–45 parts of styrene or diallyl phthalate, the polyester, plus the amino compound, plus the styrene or the diallyl phthalate totaling 100 parts; and (d) 0.1–5 parts of a photocuring rate accelerator per 100 parts of the polyester plus the amino compound plus the styrene or the diallyl phthalate, said process comprising irradiating a film of said composition with actinic light for 0.001–60 minutes at a rate to provide about 0.001–20 watts per square centimeter of film surface.

13. The process of claim 12 in which the ethylenically unsaturated polycarboxylic acid has 2–8 carbon atoms.

14. The process of claim 12 in which the polyhydric alcohol has 2–12 carbon atoms.

* * * * *

UNITED STATES PATENT AND TRADEMARK OFFICE
CERTIFICATE OF CORRECTION

PATENT NO. : 3,926,755
DATED : December 16, 1975
INVENTOR(S) : Nelson S. Marans; Alfred Gluecksmann It is certified that error appears in the above-identified patent and that said Letters Patent are hereby corrected as shown below:

In item [75] of the title page change the last name of the second inventor from "Gluecksman" to --Gluecksmann--.

Signed and Sealed this fourth Day of May 1976

[SEAL]

Attest:

RUTH C. MASON
*Attesting Officer*

C. MARSHALL DANN
*Commissioner of Patents and Trademarks*